(12) United States Patent
Hunt

(10) Patent No.: US 9,417,922 B2
(45) Date of Patent: *Aug. 16, 2016

(54) SYSTEMS AND METHODS FOR PROTECTING AN IDENTITY IN NETWORK COMMUNICATIONS

(71) Applicant: Cutting Edge Consulting Associates, Inc., Chantilly, VA (US)

(72) Inventor: Barbara M. Hunt, McLean, VA (US)

(73) Assignee: CUTTING EDGE CONSULTING ASSOCIATES, INC., Chantilly, VA (US)

( * ) Notice: Subject to any disclaimer, the term of this patent is extended or adjusted under 35 U.S.C. 154(b) by 333 days.

This patent is subject to a terminal disclaimer.

(21) Appl. No.: 13/961,379

(22) Filed: Aug. 7, 2013

(65) Prior Publication Data

US 2014/0156818 A1   Jun. 5, 2014

Related U.S. Application Data

(60) Provisional application No. 61/732,664, filed on Dec. 3, 2012.

(51) Int. Cl.
| | |
|---|---|
| G06F 15/173 | (2006.01) |
| G06F 9/50 | (2006.01) |
| H04L 29/06 | (2006.01) |
| H04L 12/707 | (2013.01) |
| H04L 12/931 | (2013.01) |
| H04L 12/713 | (2013.01) |
| H04L 29/08 | (2006.01) |

(52) U.S. Cl.
CPC ........ *G06F 9/5038* (2013.01); *H04L 29/08981* (2013.01); *H04L 45/22* (2013.01); *H04L 63/0407* (2013.01); *H04L 45/586* (2013.01); *H04L 49/70* (2013.01); *H04L 63/1441* (2013.01); *H04L 67/10* (2013.01)

(58) Field of Classification Search
CPC . H04L 67/10; H04L 41/0803; H04L 41/5051; H04L 43/0876; H04L 41/50
See application file for complete search history.

(56) References Cited

U.S. PATENT DOCUMENTS

| | | |
|---|---|---|
| 6,266,704 B1 | 7/2001 | Reed et al. |
| 2009/0031042 A1 | 1/2009 | Phatak |
| 2012/0278804 A1 | 11/2012 | Narayanasamy et al. |

(Continued)

OTHER PUBLICATIONS

International Search Report and Written Opinion mailed May 13, 2014, in corresponding PCT Application No. PCT/US2013/072836.

(Continued)

*Primary Examiner* — Peling Shaw
(74) *Attorney, Agent, or Firm* — Cooley LLP

(57) ABSTRACT

In some embodiments, a method includes sending a first data unit, received from a source device, to a destination device via a first data unit path. The first data unit path includes (1) a first virtual machine and a second virtual machine that are included in a first network, and (2) a third virtual machine that is included in a second network. Furthermore, the first data unit path includes the first virtual machine, the second virtual machine, and the third virtual machine in a first order. The method includes sending a second data unit, received from the source device, to the destination device via a second data unit path from the source device to the destination device. The second data unit path includes each of the first virtual machine, the second virtual machine, and the third virtual machine in a second order different from the first order.

21 Claims, 9 Drawing Sheets

(56) References Cited

U.S. PATENT DOCUMENTS

| | | |
|---|---|---|
| 2013/0044764 A1* | 2/2013 | Casado et al. ............... 370/401 |
| 2013/0132532 A1 | 5/2013 | Zhang et al. |
| 2013/0263125 A1 | 10/2013 | Shamsee et al. |
| 2013/0311988 A1 | 11/2013 | Boss et al. |
| 2013/0322446 A1 | 12/2013 | Biswas et al. |
| 2014/0098815 A1* | 4/2014 | Mishra ................. H04L 45/021 370/390 |

OTHER PUBLICATIONS

Office Action dated Dec. 31, 2013 for U.S. Appl. No. 14/036,731.
Office Action dated Jun. 2, 2014 for U.S. Appl. No. 14/036,731.

* cited by examiner

SYSTEMS AND METHODS FOR PROTECTING AN IDENTITY IN NETWORK COMMUNICATIONS

RELATED APPLICATIONS

The present invention claims priority to U.S. Provisional Application No. 61/732,664 filed on Dec. 3, 2012 and titled "Systems and Methods for Protecting an Identity in Network Communications," the contents of which is herein incorporated by reference in its entirety.

BACKGROUND

Some embodiments described herein relate to protecting a source identity in network communications.

Known methods of communications within and across networks having commercial clouds is typically through routing at the network layer based on an external internet protocol (IP) address. The network will forward the packets to the requested IP address via the most expedient path available. This communications method, however, fails to provide for the ability to route via one or more intermediate locations to mask the source or identity of the communications.

Thus, a need exists for additional routing techniques that provide an automated ability to control the routing of communications within and across networks having commercial clouds and networks.

SUMMARY

In some embodiments, a method includes sending a first data unit, received from a source device, to a destination device via a first data unit path. The first data unit path includes (1) a first virtual machine and a second virtual machine that are included in a first network, and (2) a third virtual machine that is included in a second network. Furthermore, the first data unit path includes the first virtual machine, the second virtual machine, and the third virtual machine in a first order. The method includes sending a second data unit, received from the source device, to the destination device via a second data unit path from the source device to the destination device. The second data unit path includes each of the first virtual machine, the second virtual machine, and the third virtual machine in a second order different from the first order.

DETAILED DESCRIPTION

Figure 1:
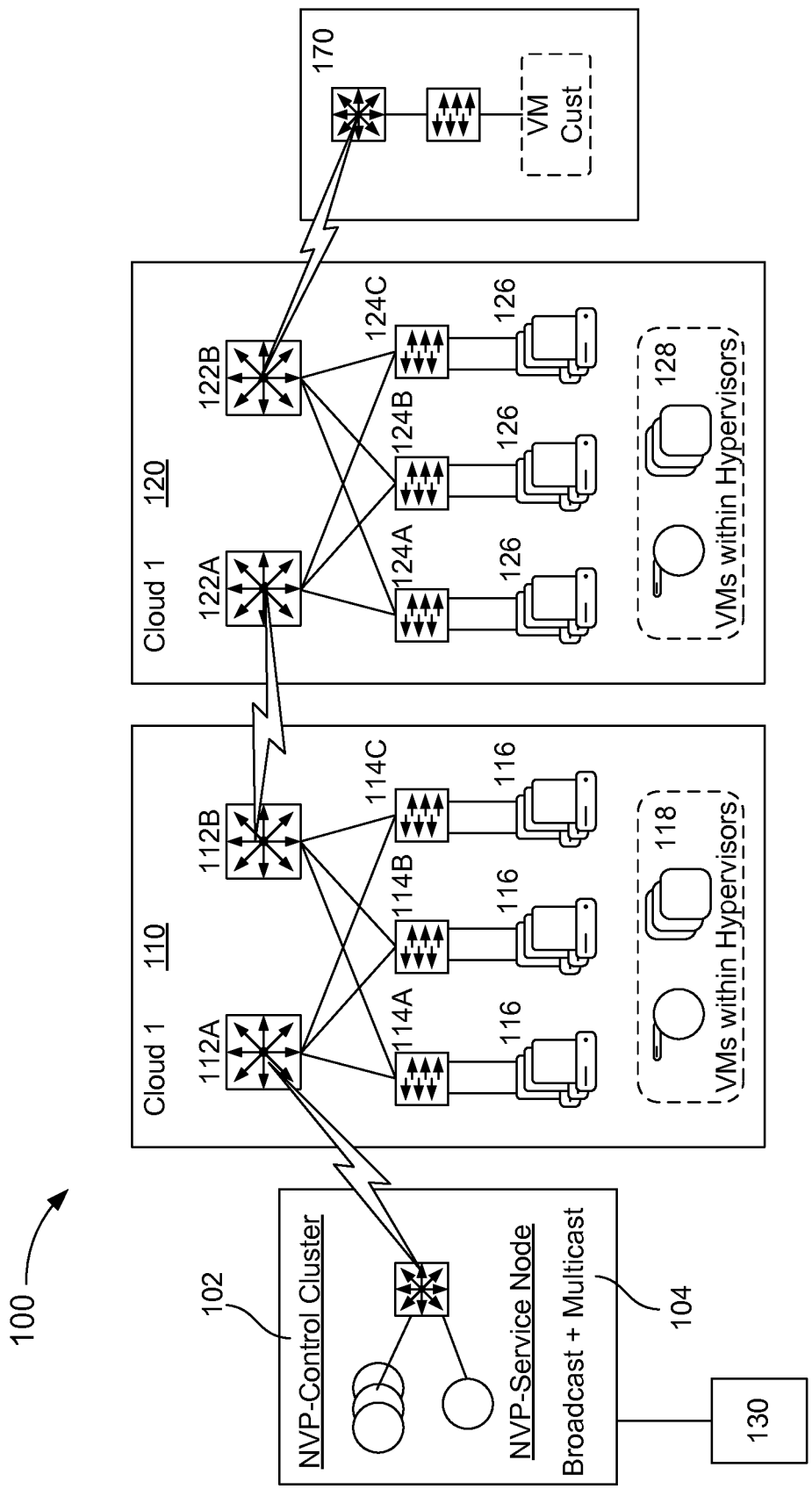
FIG. 1 is a schematic diagram of an identity-protection system ("system"), according to an embodiment.

In some embodiments, an apparatus includes a network layout module configured to be operatively coupled to a first network that includes a first virtual machine and a second virtual machine, and that is configured to be operatively coupled to a source device and a destination device. The network layout module is configured to be operatively coupled to a second network, different from the first network, that includes a third virtual machine and a fourth virtual machine, and that is configured to be operatively coupled to the source device and the destination device. The network layout module configured to define, at a first time, a first data unit path from the source device to the destination device. The first data unit path includes each of the first virtual machine, the second virtual machine, the third virtual machine and the fourth virtual machine in a first order. The network layout module configured define, at a second time after the first time, and in response to an event, a second data unit path from the source device to the destination device. The second data unit path includes each of the first virtual machine, the second virtual machine, the third virtual machine and the fourth virtual machine in a second order different from the first order.

In some embodiments, a method includes defining, at a first time, a first data unit path from a source device to a destination device, the first data unit path includes (1) a first virtual machine and a second virtual machine that are included in a first network, and (2) a third virtual machine that is included in a second network. The first data unit path includes the first virtual machine, the second virtual machine, and the third virtual machine in a first order. The method includes modifying, in response to defining the first data unit path, a routing table such that a first data unit sent from the source device to the destination device, prior to a second time after the first time, follows the first data unit path. The method includes defining, after the second time, a second data unit path from the source device to the destination device. The second data unit path includes each of the first virtual machine, the second virtual machine, and the third virtual machine in a second order different from the first order. The method includes modifying, in response to defining the second data unit path, the routing table such that a second data unit sent from the source device to the destination device, after the second time, follows the second data unit path.

In some embodiments, a method includes sending a first data unit, received from a source device, to a destination device via a first data unit path. The first data unit path includes (1) a first virtual machine and a second virtual machine that are included in a first network, and (2) a third virtual machine that is included in a second network. Furthermore, the first data unit path includes the first virtual machine, the second virtual machine, and the third virtual machine in a first order. The method includes sending a second data unit, received from the source device, to the destination device via a second data unit path from the source device to the destination device. The second data unit path includes each of the first virtual machine, the second virtual machine, and the third virtual machine in a second order different from the first order.

Some embodiments provide cloud-based secure virtual private networks (VPNs) and identity-(persona-) protected access to the Internet. Some embodiments provide support for customer migration to the cloud, a range of identity management and persona attribution options, secure network connectivity, and control of customer information held within commercial cloud providers' databases. Some embodiments can distribute the communications activity, data storage, and work dynamically within and across multiple clouds simultaneously (also collectively referred to as the network). Some embodiments can also provide a mix of cloud transport, application location, and data storage options. Some embodiments can be implemented to provide each customer with the ability to define their own dedicated network(s) within a service infrastructure. In addition, some embodiments can augment the multi-layered security capabilities provided by the commercial cloud providers with an additional layer of encryption and implementation of dynamic security policies that prohibit malicious traffic from entering the network. With such embodiments, companies can take advantage of all the benefits of cloud technology while improving the overall resiliency, security and exposure on the Internet.

In one embodiment, user-identity-protected access to the Internet can be provided using commercial clouds for transport purposes. This embodiment can provide enhanced capabilities for customer access to the Internet with a range of identity (persona) management options, geolocation sites, and control of the customer information held within commercial providers' databases. This embodiment can distribute the communications activity dynamically within and across multiple clouds simultaneously and regularly churn the underlying network infrastructure. The dynamic transport of communications for Internet access across multiple commercial providers make actual user information and origination identities a very difficult target for hackers, search engine optimization companies, and other privacy threats.

In some embodiments, users can have the option to connect into an identity-protection system (system) within a network via a standard IP browser session (OSI Layer 3) or though a Virtual Private Network connection (OSI Layer 2). Separate identities can be established to acquire infrastructure information (e.g., servers, bandwidth, IP addresses) from Cloud 1 and Cloud 2 providers. Layer 2 Internet Protocol Security ("IPSEC") tunnels can be established between the service equipment, Cloud 1 infrastructure, and Cloud 2 infrastructure to ensure that the IP traffic is routed through the network as architected to appropriately protect the user information and origination identities.

To efficiently manage the complexity of establishing and maintaining the network for the service, a virtualization platform, for example, the Nicira Network Virtualization Platform (NVP), can be used. NVP is a distributed software suite that defines scalable, fully featured, isolated virtual networks that are completely decoupled and independent from the physical network. In some embodiments, other virtualization platforms can be used.

Known uses of the Nicira NVP product address the barriers of scaling network infrastructure in data centers to keep pace with the rapid expansion of cloud technology. Network virtualization decouples network services from the underlying physical hardware enabling programmatic creation of agile, virtual networks to complement the implementation of storage and compute virtualization.

Embodiments described herein can use features of the standard Nicira NVP product. Such embodiments can establish a logical Layer 2 network across the physical infrastructure (the system, Cloud 1, and Cloud 2) through use of NVP, adding Virtual Machines (VMs) connected to the NVP logical networks on a hypervisor at each point of the network. Such embodiments can develop specific routing instructions for each VM to force the communications to follow the intended path.

As discussed above, embodiments of the system can provide identity protection by using a virtualization platform, for example, the Nicira Network Virtualization Platform (NVP). A virtualization platform can be a network control plane that can enable programmatic control of networking capabilities within multi-tenant cloud data centers. Just as server virtualization can provide flexible control of virtual machines (VMs) running on a pool of server hardware, NVP's network virtualization, and other virtualization platforms, can provide a centralized application programming interface (API) to provision and configure one or more isolated logical networks on top of a single physical network, or more than one physical networks. Logical networks can decouple VM connectivity and network services from the physical network, and can give cloud providers the flexibility to place or migrate VMs anywhere within data centers (or spanning multiple data centers) while still supporting Layer-2 (L2) connectivity and other enterprise-class network capabilities.

NVP can provide two network views: (1) the logical network view and (2) the transport network view. The logical network view can describe the connectivity and network services a VM identifies in the cloud. This view can be independent of the underlying physical devices of the data center(s) and can be independent of the most expedient path between a user and a network. The transport network view can describe the physical devices (the hypervisors that host VMs and the physical network hardware that can connect the hypervisor machines) that can handle the actual packet processing and forwarding that underlie the logical network.

In some embodiments, the logical network view and the transport network view can exist simultaneously. NVP can act as a network hypervisor that can virtualize the transport network view devices to faithfully implement the network view. This task can be analogous to how an x86-based hypervisor server can provide each VM with a logical view of resources (e.g., virtual CPU, memory, and disks) by mapping virtual resources to physical server hardware.

When changes in the logical network view occur, NVP can modify the forwarding state of all relevant Open Virtual Switch (OVS) devices in the transport network view to reflect the changes. Similarly, when changes in the transport network view occur, NVP can update the forwarding rules and state in the transport network view so the connectivity identified by the VMs remains constant with the logical network view.

At its core, NVP can expose a centralized API that can be used to define the logical network view and to control it across the transport network view. This can make packet forwarding consistent with the logical description.

As described above, the NVP can include a control plane and a data plane. With regard to the control plane, a controller cluster module can provide the NVP API (which can be exposed as a web service) used to define the logical network view and can manage the forwarding state at all transport nodes that the controller cluster module manages that are running OVS. The controller cluster module can be a distributed system that runs on a set of x86 servers. The data plane can be implemented by access-layer switching devices (hypervisor based Open Virtual Switches) that can be managed by the controller cluster module. Known network hardware (not managed by the cluster) can provide the bandwidth to interconnect these access-layer devices, enabling them to define network overlays that can implement the logical network view.

The virtualization platform can include NVP access switches that can support the Open vSwitch (OVS) management interface. OVS management interface can be an open protocol that enables control and visibility of packet forwarding by a switch. Endpoints connected to OVS-enabled access switches can be operatively coupled to a logical network to send and receive data (e.g., packets, cells, etc). Endpoints can include, for example, hypervisors and/or gateways. A hypervisor can include a vSwitch that can be OVS-enabled, which can allow VM endpoints running on the hypervisor to be attached to a logical network. A gateway can attach a logical network to a physical network that is not managed by NVP, e.g., the Internet. Each gateway can operate as an L2-gateway service that send data to a physical L2-segment, or can operate as an L3-gateway service mapped to a physical router port.

In the data plane, logical switches can be implemented using different encapsulation mechanisms, which result in two different types of logical networks: (1) overlay logical networks, and (2) bridged logical networks. Overlay logical networks can use L2-in-L3 tunneling, such that logical network topology can be completely decoupled from transport network topology. Bridged logical networks may not use encapsulation, and alternatively, VM traffic on bridged logical networks can be sent directly on the physical network, similar to traditional hypervisor networking. Overlay logical networks can include service nodes. A service node can be an OVS-enabled x86 appliance that can be managed by the controller cluster module and can be used to provide extra packet processing capacity to implement logical networks.

The virtualization platform can separate management traffic, e.g., traffic within the system that instantiates virtual machines, defines and/or updates routing tables, etc, from data traffic. Management traffic can be sent and received between OVS devices and the controller cluster module while data traffic can be sent and received directly between the OVS devices. The controller cluster module can remain outside the data path.

The virtualization platform can manage and/or otherwise control the path that data takes through an identity-protection system (system). Said another way, the virtualization platform can define a network layout of the system and can therefore control the path data takes through the defined network layout. An OVS management connection can use SSL for security and can provide the controller cluster module with an interface to: (1) view the set of endpoints (VMs or external networks) present on a given OVS device; (2) distribute the logical network forwarding state down to the OVS devices; and (3) manipulate OVS packet forwarding to implement the logical network view.

The virtualization platform can be configured such that data traffic to/from the VM or external network endpoints can be handled by OVS devices (hypervisors, gateways, and service nodes). For example, a hypervisor in one data center can tunnel packets to another hypervisor in a different data center, which can provide L2 connectivity between two VMs that are on the same logical network. For another example, a hypervisor can tunnel a packet to a service node, which can encapsulate that packet and forward it using a secure VPN tunnel to a gateway in a remote customer premises.

As discussed above the virtualization platform can be used to define one or more networks included in a system. A network defined by the virtualization platform can include a transport network view and a logical network view.

The transport network view can include entities that communicate via an API and that can inform the controller cluster module about the set of OVS devices the controller cluster module should manage and how these OVS devices can communicate to create network overlays. These entities shown in the transport network view can includes transport nodes, transport zones, and transport connectors. A transport node can be any OVS device managed by the controller cluster module, including hypervisors, gateways and service nodes. A transport zone can be a physical network that can connect a set of transport nodes. Finally, a transport connector can include the IP address(es) and encapsulation type(s), define by the controller cluster as attachments to be used by transport nodes to communicate with each other when implementing overlay logical networks. For bridged logical networks, transport connectors can indicate the OVS Bridge a hypervisor should use when sending/receiving decapsulated traffic.

The logical network view can include entities that communicate via an API and that can describe the network connectivity identified by endpoints (VMs and external networks) that are plugged into OVS access switches. API entities shown in the logical network view include logical switches, logical switch ports, logical routers, and attachments. A logical switch can be an L2 switching overlay implemented using one of the supported encapsulation mechanisms (GRE, IPsecGRE, STT, IPsecSTT, or Bridge). A logical switch port can be similar to a physical switch port, and can enable the configuration of network services (e.g., security profiles, QoS policies) and can expose data for monitoring or troubleshooting. A logical router, e.g., a virtual L3 router, can be implemented using one of the supported encapsulation mechanisms (generic routing encapsulation (GRE), IPsecGRE, spin transfer torque (STT) STT, IPsecSTT, or Bridge). Finally, an attachment can include a "logical wire," (e.g., a logical connection), that associates a VM interface (VIF attachment) or external network (L2 gateway attachment, L3 gateway attachment) with a logical port.

Identity-protection systems described herein can be configured to protect identities and/or locations (herein "identity/identities") in and accessing a network. For example, identity-protection systems can protect an identity of a user and/or an organization, and/or the location of data (stored and/or executable). Identity-protection systems can protect an identity of a private source from a public destination (e.g., a destination on a wide area network such as the internet); can protect the identities of a private source and/or a private destination from a third party, malicious or otherwise, for example, via a secure private network; can protect the location of stored and/or executable data; and/or can define isolated private networks.

FIG. 1 depicts a schematic diagram of an identity-protection system ("system") 100 according to an embodiment. Specifically, FIG. 1 depicts a physical view of system 100. System 100 can include the architecture of the network, (e.g., the core level, the aggregation level, the server level, etc) that can provide identity-protected access to a network 170 across two commercial clouds as described above. As shown in FIG. 1, system 100 can include a control cluster module 102, a service node module 104, a first cloud 110, a second cloud 120, and a customer module 130. While shown in FIG. 1 as including two commercial clouds, in other embodiments, the system can include more or fewer clouds. In some embodiments, control cluster module 102 and/or service module 104 can be installed and/or otherwise distributed across one or more compute devices, (e.g., server) in a data center (not shown). In some embodiments, the data center can be the same or different from a data center hosting cloud 110 and/or cloud 120. Customer module 130 can be used to manage system 100, for example, manage the specific aspects of system 100 that are associated with a particular customer (user).

As shown in FIG. 1, cloud 110 can include one or more core modules 112A, 112B and one or more aggregation module, 114A-114C. Similarly, cloud 120 can include one or more core modules 122A, 122B and one or more aggregation module, 124A-124C. While cloud 110 and cloud 120 are shown in FIG. 1 as including two core modules and 3 aggregation modules each, in other embodiments either of cloud 110 and/or cloud 120 can include more or fewer core and/or aggregation switches.

In some embodiments, a virtualization platform (e.g., NVP) can be installed on one or more physical servers 116 within each of cloud 110 and cloud 120. In such embodiments, the virtualization platform can be used to instantiate multiple virtual machines 118. In some embodiments, a hypervisor transport node module can be installed to facilitate the data transport within each cloud. A hypervisor transport node module can include a hypervisor and Open vSwitch ("OVS"). In such embodiments, at least a portion of the multiple virtual machines 118 can be operatively coupled to the hypervisor to facilitate system 100 communications. In such embodiments, routing instructions for system 100 can be installed on each of the multiple virtual machines 118.

In some embodiments, a gateway transport node module (not shown) can be installed to provide external connectivity to the Internet. The gateway transport node module can be used for routing between the logical networks, and can allow for transport between cloud 110 and/or cloud 120 and the Internet. In some embodiments, physical connectivity between the hypervisor transport node module and gateway transport node module can be via internal IP addresses assigned by cloud 110 and cloud 120.

In some instances, control cluster module 102, also referred to herein as network layout module, can manage hypervisor transport node modules and gateway transport node modules. In such instances, when a new hypervisor transport node module and/or a gateway transport node module are instantiated, control cluster 102 can be notified to begin managing the respective module.

Transport node modules (e.g., hypervisor transport node module and/or a gateway transport node module) can communicate with each other to implement logical networks. Transport connectors (not shown in FIG. 1) can define an encapsulation mechanism and identifiers used for those connections.

Figure 2:
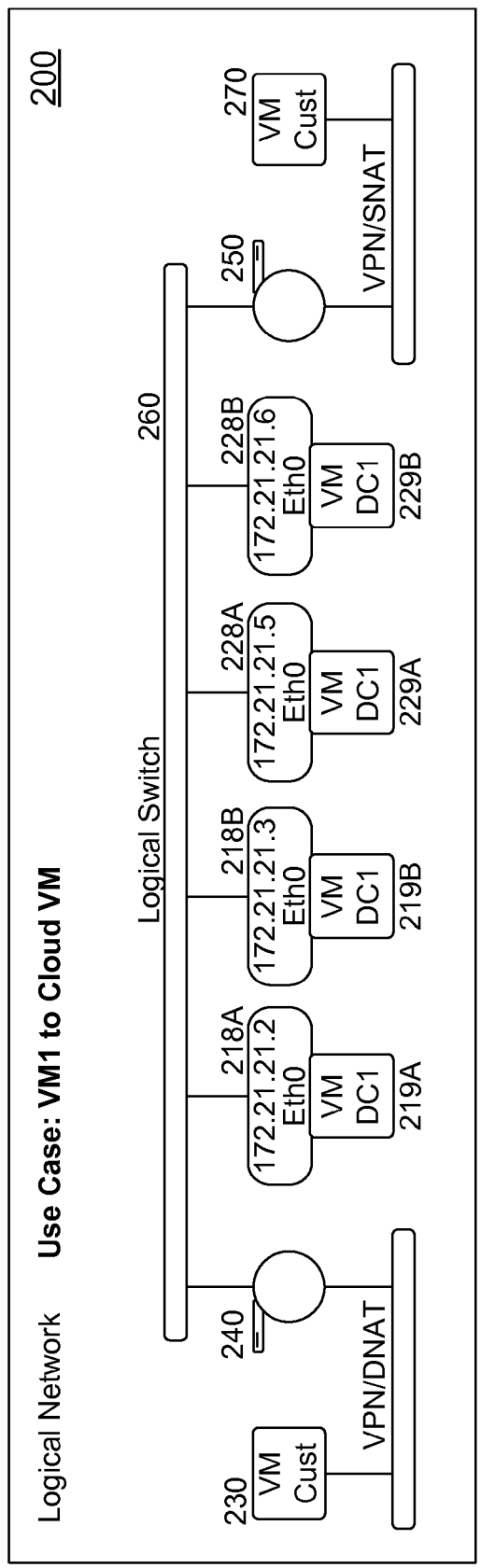
FIG. 2 is a schematic diagram of a system, according to an embodiment.

FIG. 2. depicts a schematic diagram of the system 200 according to an embodiment. Specifically, FIG. 2 depicts a logical network view of system 200. System 200 can be similar to and include similar elements as system 100, and can be used to connect a user 230 to a network 270. System 200 includes a customer module 230, a gateway transport node module 240, a gateway transport node module 250, a logical switch 260, and hypervisor transport node modules 218A, 218B, 228A, 228B. In some embodiments, some hypervisor transport node modules can be instantiated in a first cloud (not shown in FIG. 2) and some hypervisor transport node modules can be instantiated in a second cloud (not shown in FIG. 2). System 200 can be the network that virtual machines 219A, 219B, 229A, 229B identifies. Gateway transport node module 240, gateway transport node module 250, and hypervisor transport node modules 218A, 218B, 228A, 228B communicate with each other to implement the logical network of system 200. In some embodiments, the virtualization platform instantiates and/or otherwise uses logical switches (e.g. logical switch 260) and logical ports (not shown in FIG. 2) to represent connectivity and port configuration within the logical view. Virtual machines 219A, 219B, 229A, 229B interface with external physical networks via logical ports.

In some embodiments, OVSs can expose/bridge each of virtual machines 219A, 219B, 229A, 229B to the hypervisor's physical network interface. In some embodiments, each logical port can include an attachment that can act as a source/sink of traffic sent in and out of the logical network. In some embodiments, virtual machines 219A, 219B, 229A, 229B can use a virtual interface (Vif) Attachment such that communications across the entire network are identified as being associated with one logical switch. This attachment can allow the virtual machines 219A, 219B, 229A, 229B to move data from one port to another across the network. Each of virtual machines 219A, 219B, 229A, 229B can include routing instructions to facilitate communication through the logical network of system 200. In some embodiments, gateway transport node modules 240, 250 can use an L3 gateway attachment that can allow a connection of a logical switch port to a physical network interface exposed via a virtualization platform gateway service (e.g., a node configured to allow communications between networks using the same and/or different protocols).

Figure 3:
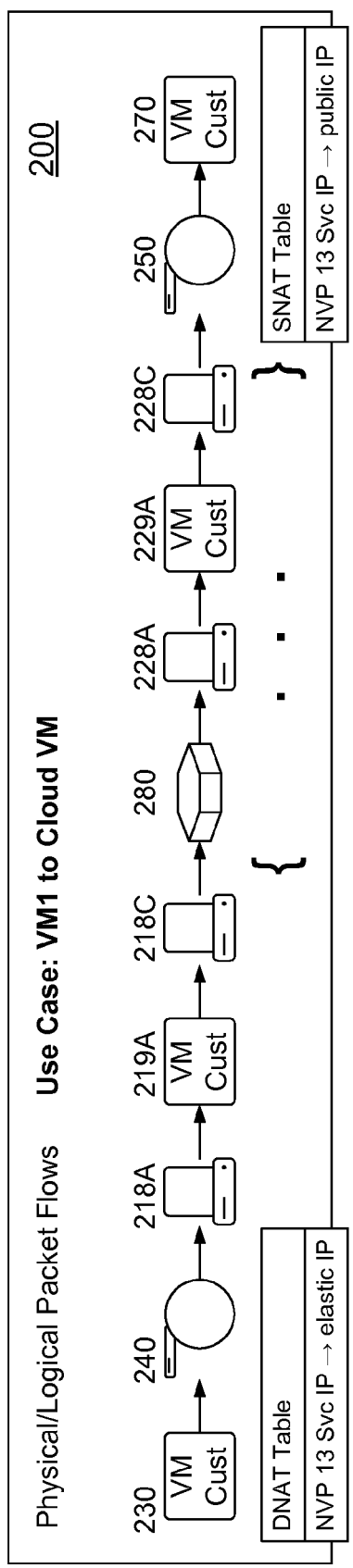
FIG. 3 is a schematic diagram of the system depicted in FIG. 2, according to an embodiment.

FIG. 3 depicts a schematic diagram of the flow of a packet through system 200 according to an embodiment. Specifically, FIG. 3 depicts a logical-physical view of a packet flowing through system 200. With reference to FIG. 2, a user can initiate transmission of data that includes a packet at customer module 230. The packet can be sent to gateway transport node module 240, and can be switched by an OVS associated with hypervisor transport node module 218A, using a routing table, to virtual machine 219A. When the packet first enters the system 200, one or more Destination Network Address Translation (DNAT) table(s) 301 can be used to map an external, e.g., public IP address to an internal, e.g., private IP address. In some embodiments, when a packet enters system 200, gateway transport node module 240 can append an internal IP address to the packet based on its external IP address. In such embodiments, the internal IP address can be used, in conjunction with the routing table(s), to route the packet through system 200. Next, the packet can be switched by an OVS associated with a hypervisor transport node module 218C, using a routing table, to a physical interface 280 between the first cloud and the second cloud. The packet can then be switched by an OVS associated with hypervisor transport node module 228A, using a routing table, to virtual machine 229A. Next, the packet can be switched by an OVS associated with a hypervisor transport node module 228C, using a routing table, to gateway transport node module 250 and out of system 200 to, network 270. Before the packet first exits the system 200, one or more Source Network Address Translation (SNAT) table(s) 303 can be used to map an internal IP address to an external IP address. In some embodiments, when a packet enters system 200, gateway transport module 250 can append the external IP address to the packet based on its internal IP address. In such embodiments, the external IP address can be used to route the packet to it final destination outside of system 200.

As described above, the path a packet takes through system 200 can be dynamically changed based on a perceived threat, on a predetermined schedule, etc. In such instances, the path can travel between any number of virtual machines across any number of clouds. In some such embodiments, for example the path can include a first virtual machine in a first cloud, then a first virtual machine in a second cloud, then back to a second virtual machine in the first cloud, then back to a second virtual machine in the second cloud. In such embodiments, the routing tables can be updated to ensure proper routing within the network for legitimate traffic. In some embodiments, because the path changes, an intruder seeking to discern the location of a client website and/or otherwise uncover a source of a packet would be unable to trace the packet via the original path, because that path may change.

Systems 100 and 200 described above can be used in a variety of ways to protect identities as described herein. FIGS. 4-7 depict several embodiments of identity-protection systems that can use systems similar to systems 100, 200 to protect identities. Specifically, systems described herein can dynamically change a data path between a source and a destination (1) to protect an identity (see, e.g., FIG. 4), (2) to protect the location and/or contents of a storage module (see, e.g., FIG. 5), (3) to define secure virtual private networks (see, e.g., FIG. 6), and/or (4) to isolate identity-protected networks (see, e.g., FIG. 7).

Figure 4:
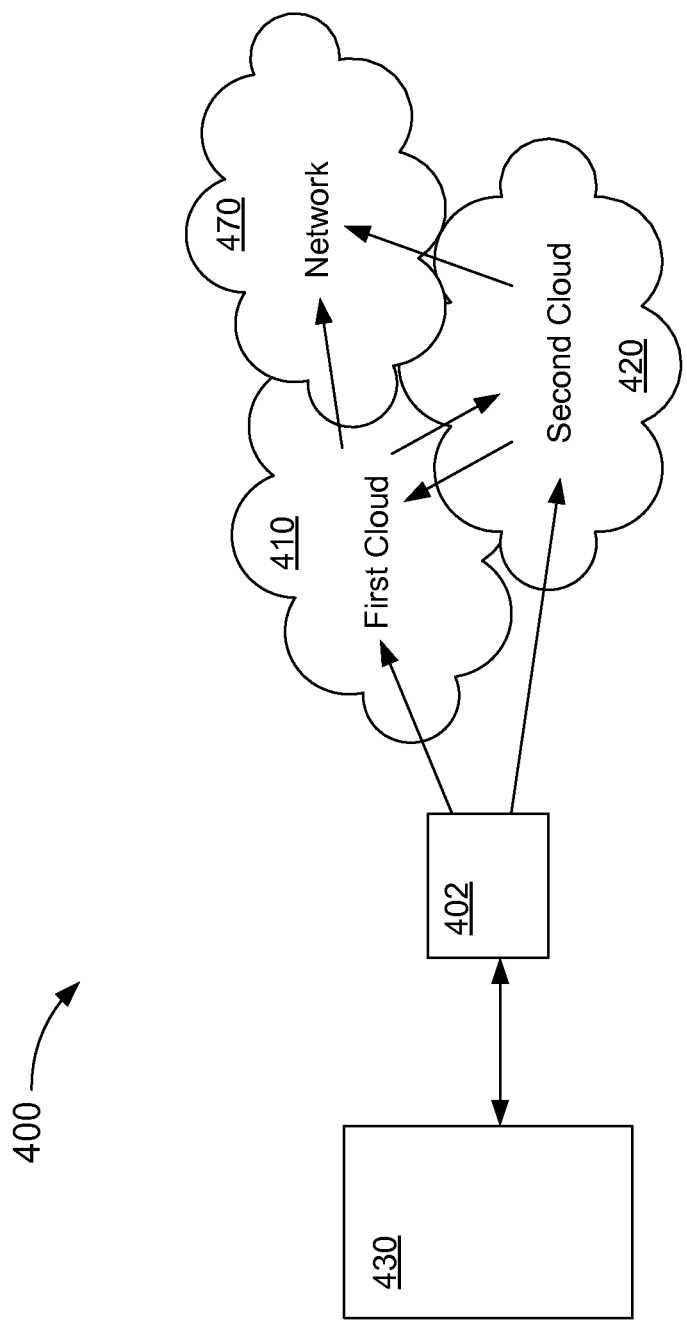
FIG. 4 is a schematic illustration of an identity-protection system, according to an embodiment.

FIG. 4 depicts a schematic diagram of a physical layout for identity-protection system ("system") 400 according to an embodiment. The system can include network layout module 402, a first cloud 410, and a second cloud 420, and can provide communication with a network 470. Communication between a user 430 and network 470 can include one or more data paths via first cloud 410 and/or second cloud 420 and via one or more virtual machines (VM) (not shown) instantiated in first cloud 410 and/or first cloud 420. For example, communication between a user of system 400 and the network 470 can routed through a first VM in first cloud 410, a first VM in second cloud 420, a second VM in first cloud 410, a second VM in second cloud 420, and then to network 470. Furthermore, as described herein, the data path between a user 430 and network 470 can dynamically change on a schedule, randomly, pseudo-randomly, upon detection of a threat, by an administrator of system 400, etc. In this manner, an attempt to identify the source location of a data transmitter along an initial path may be prevented because a new path has been established within system 400. In such embodiments, network layout module 402, can facilitate the updating and distribution of routing tables within system 400.

Figure 5:
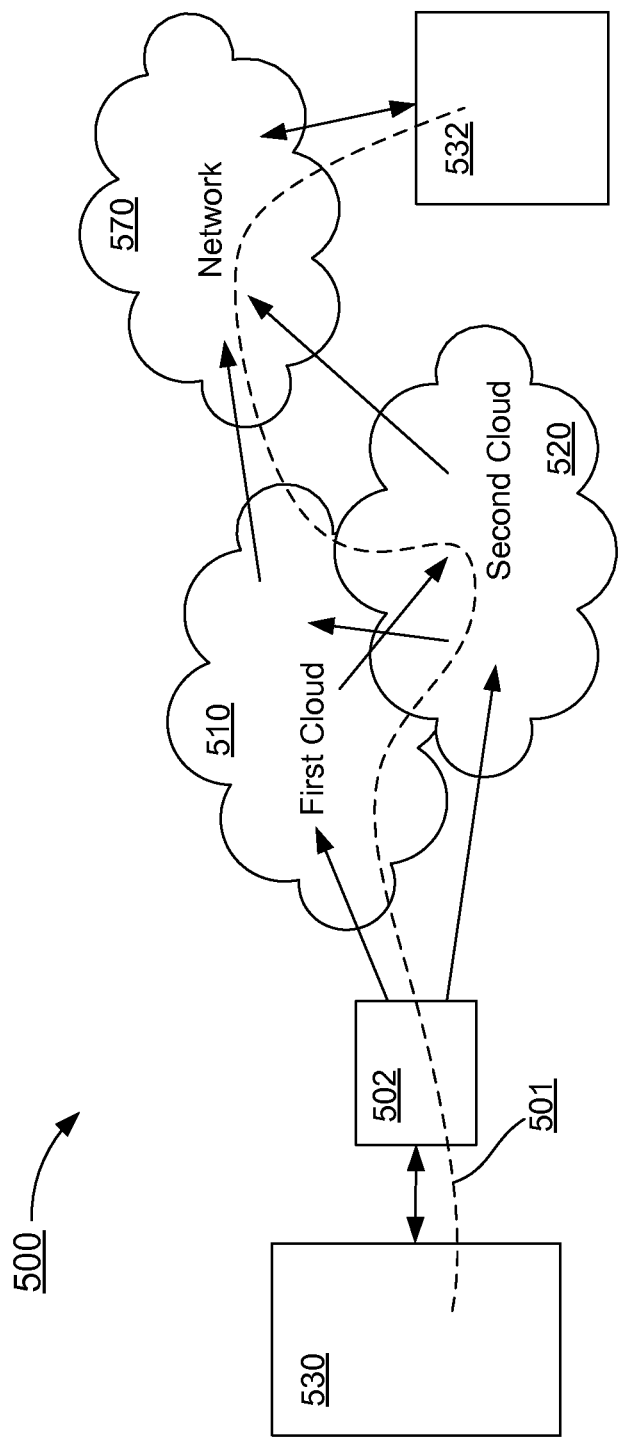
FIG. 5 is a schematic illustration of an identity-protection system, according to an embodiment.

FIG. 5 depicts a schematic diagram of a physical layout for an identity-protection system ("system") 500 according to an embodiment. As shown in FIG. 5, system 500 can be used to define one or more secure virtual private networks 501 between a first entity 530 and a second entity 532. System 500 can be similar to system 400 and can include similar components, for example, system 500 includes a network layout module 502 that can be similar to network layout module 402 of system 400. System 500 can also include a first cloud 510 and a second cloud 520, and can provide communication with a network 570. Entities 530, 532 can be a device accessible by and/or associated with an organization and/or a user. Communication between entity 530 and entity 532 can be via network 570 and can include one or more data paths via cloud 510 and/or cloud 520 and via one or more virtual machines (VM) (not shown) instantiated in cloud 510 and/or cloud 520. For example, communication between entity 530 and entity 532 via network 570 can routed through a first VM in cloud 510, a first VM in cloud 520, a second VM in cloud 510, a second VM in cloud 520, and then to entity 532 via network 570. Furthermore, as described herein, the data path between entity 530 and entity 532 can dynamically change on a schedule, randomly, pseudo-randomly, upon detection of a threat, by an administrator of system 500, etc. In this manner, an attempt to identify the source location of a data transmitter along an initial path may be prevented because a new path has been subsequently established within system 500. In such embodiments, network layout module 502 can facilitate the updating and distribution of routing tables within system 500. In one example, entity 532 can include a device associated with an employee to access data stored remotely relative to that device, and entity 530 can include a device storing the data. In such an example, system 500 can define a secure virtual private network 501 between entity 532 and entity 530.

Figure 6:
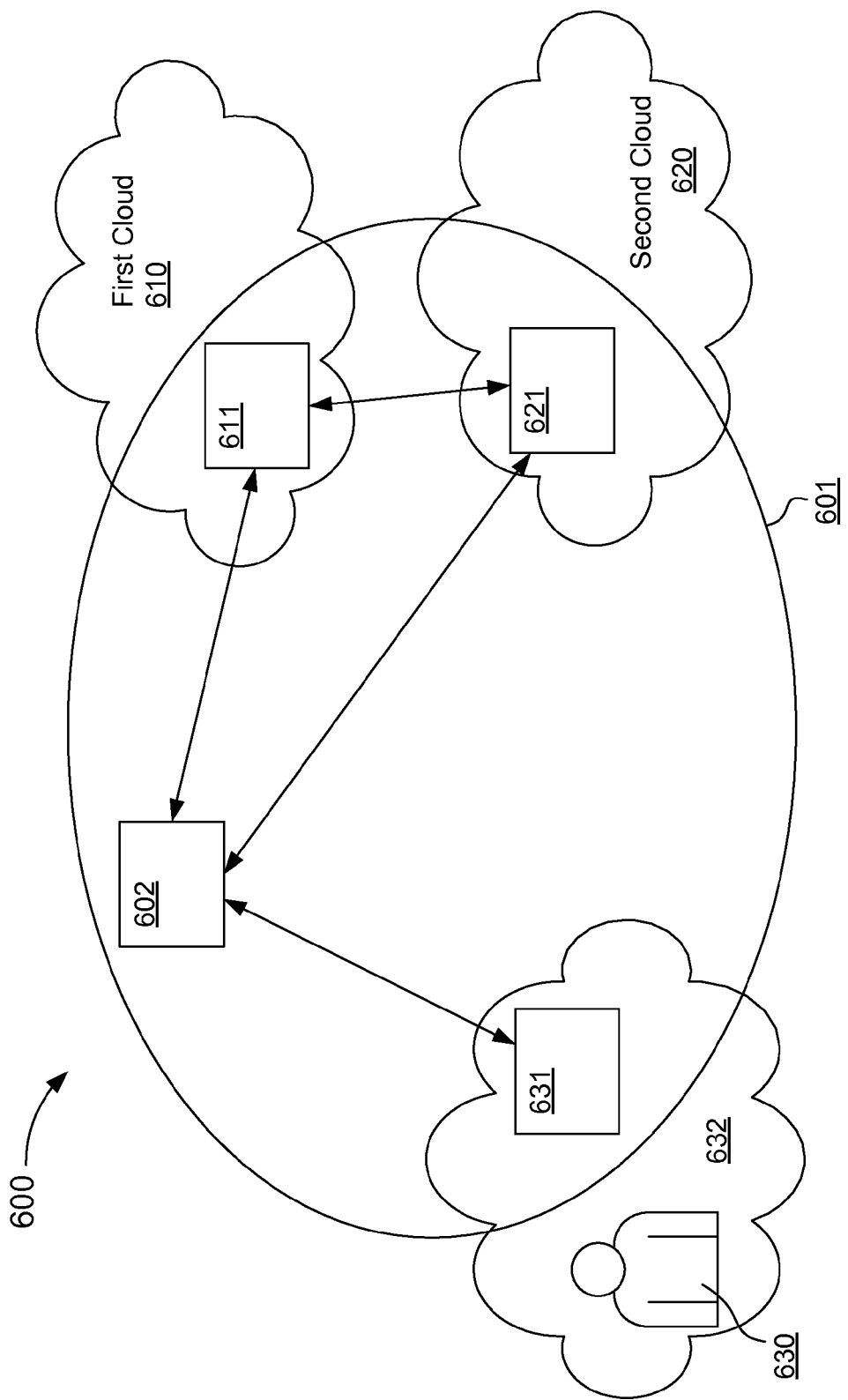
FIG. 6 is a schematic illustration of an identity-protection system, according to an embodiment.

FIG. 6 depicts a schematic diagram of a physical layout for an identity-protection system ("system") 600 according to an embodiment. As shown in FIG. 6, system 600 can be used to define one or more secure storage and/or process networks 601 accessible by an entity 630. System 600 can be similar to system 400 and can include similar components, for example, system 600 can include a network layout module 602 that can be similar to network layout module 402 of system 400. System 600 can also include a first cloud 610, a second cloud 620, a network 632, a network element 611, a network element 621, and a network element 631. In some embodiments network 632 can be an existing network for an organization and/or user. In some embodiments, a network element can include a storage location and/or program/process location.

Communication between entity 630 and any of network elements 611, 621, 631 of network 601 can include one or more data paths via cloud 610, cloud 620 and/or network 632 and via one or more virtual machines (VM) (not shown) instantiated in cloud 610, cloud 620 and/or network 632. For example, communication between entity 630 and any of network elements 611, 621, 631 can be routed through a first VM in cloud 610, a first VM in cloud 620, a second VM in cloud 610, a second VM in cloud 620, and then to any of network elements 611, 621, 631. Furthermore, as described herein, the data path between entity 630 and any of network elements 611, 621, 631 can dynamically change on a schedule, randomly, pseudo-randomly, upon detection of a threat, by an administrator of system 600, etc.

In some embodiments, the locations of network elements 611, 621, 631 and/or data paths between any of network elements 611, 621, 631 can be dynamically changed. For example, as shown in FIG. 6, network element 611 is associated with first cloud 610, network element 621 is associated with second cloud 620 and network element 631 is associated with network 632. In such an embodiment, by way of example, network element 611, specifically the data (program, process, stored data, etc) can be moved, e.g. instantiated, in second cloud 620.

As described above, an attempt to identify the source location of a data transmitter and/or a network element along an initial path may be prevented because a new path has been established within system 600. In such an example, entity 630 can access data stored at network entity 621. In the event that the data path between entity 630 and network element 621 is compromised and/or if unauthorized to access network entity 621 is attempted, either the data path can have changed, and or the location of network entity 621 can have changed. In such embodiments, network layout module 602, can facilitate the updating and distribution of routing tables within system 600.

Figure 7:
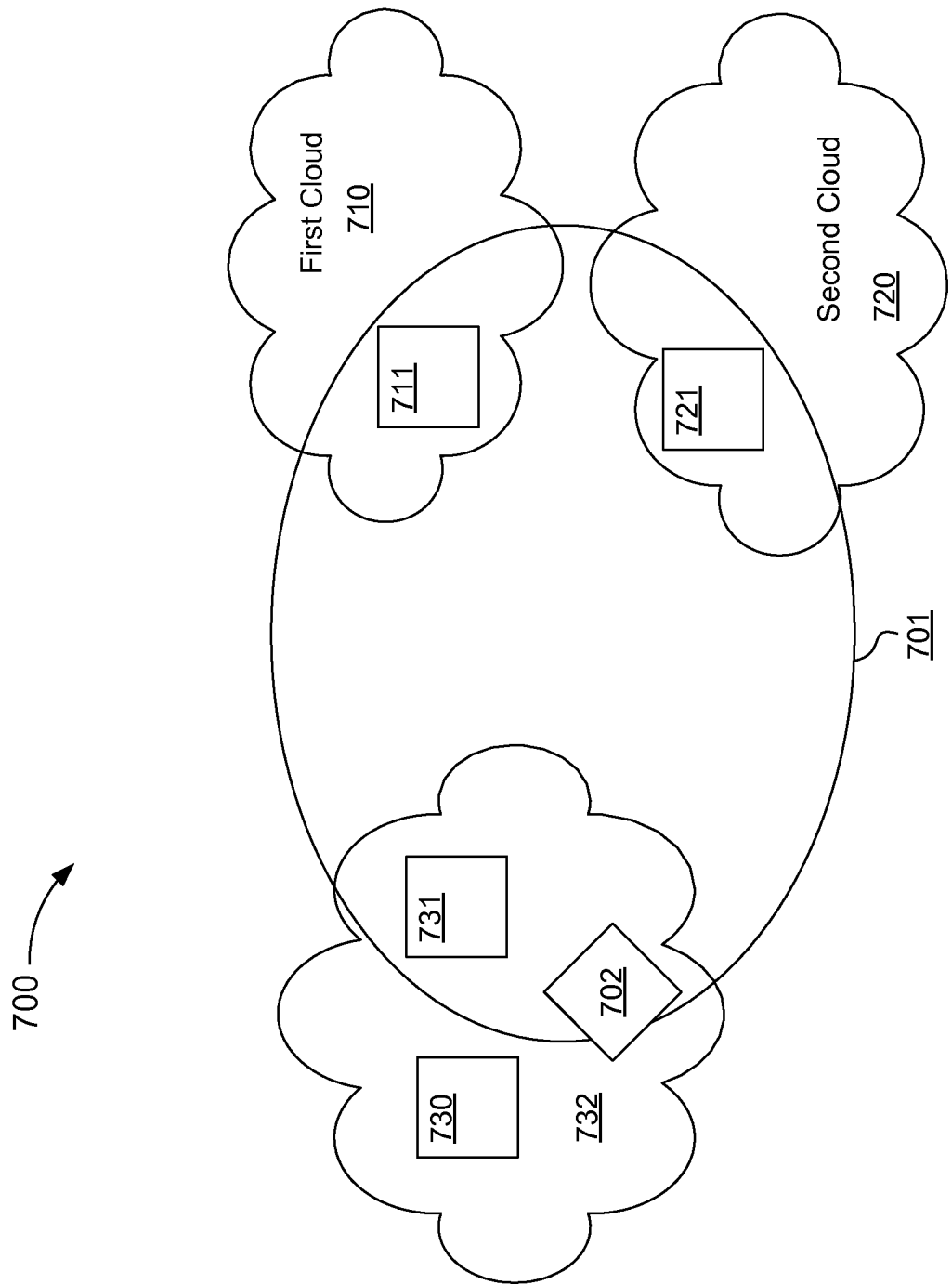
FIG. 7 is a schematic illustration of an identity-protection system, according to an embodiment.

FIG. 7 depicts a schematic diagram of a physical layout for an identity-protection system ("system") 700 according to an embodiment. As shown in FIG. 7, system 700 can be used to define one or more secure customer networks 701 accessible by an entity 730. In some embodiments, system 701 can be isolated from wide area networks, for example the internet, and/or any other network. System 700 can be similar to system 400 and can include similar components, for example, system 700 includes a network layout module 702 that can be similar to network layout module 402 of system 400. System 700 can also include a first cloud 710, a network 732, a second cloud 720, a network element 711, a network element 721, and a network element 731. In some embodiments, a network element can include a storage location and/or process location.

Communication between entity 730 and any of network elements 711, 721, 731 of network 701, and between any of any of network elements 711, 721, 731 and any of another network elements 711, 721, 731 can include one or more data paths via cloud 710 and/or cloud 720, network 732 and via one or more virtual machines (VM) (not shown) instantiated in cloud 710 and/or cloud 720, network 732. For example, communication between entity 730 and any of network elements 711, 721, 731 can be routed through a first VM in cloud 710, a first VM in cloud 720, a second VM in cloud 710, a second VM in cloud 720, and then to any of network elements 711, 721, 731 of network 701. Furthermore, as described herein, the data path between entity 730 and any of network elements 711, 721, 731, can dynamically change on a schedule, randomly, pseudo-randomly, upon detection of a threat, by an administrator of system 700, etc.

In some embodiments, the locations of network elements 711, 721, 731 and/or data paths between any of network elements 711, 721, 731 can be dynamically changed. For example, as shown in FIG. 6, network element 711 is associated with first cloud 710, network element 721 is associated with second cloud 720 and network element 731 is associated with network 732. In such an embodiment, by way of example, network element 711, specifically the data (program, process, stored data, etc) can be moved, e.g. instantiated, in second cloud 620.

As described above, entity 730 can access data stored or use a program and/or other process located at network entity 721. In the event that the data path between entity 730 and network element 721 is compromised and/or if unauthorized access to network entity 721 is attempted, either the data path can change, and or the location of network entity 721 can change. In such embodiments, network layout module 702 can facilitate the updating and distribution of routing tables within system 700.

Figure 8:
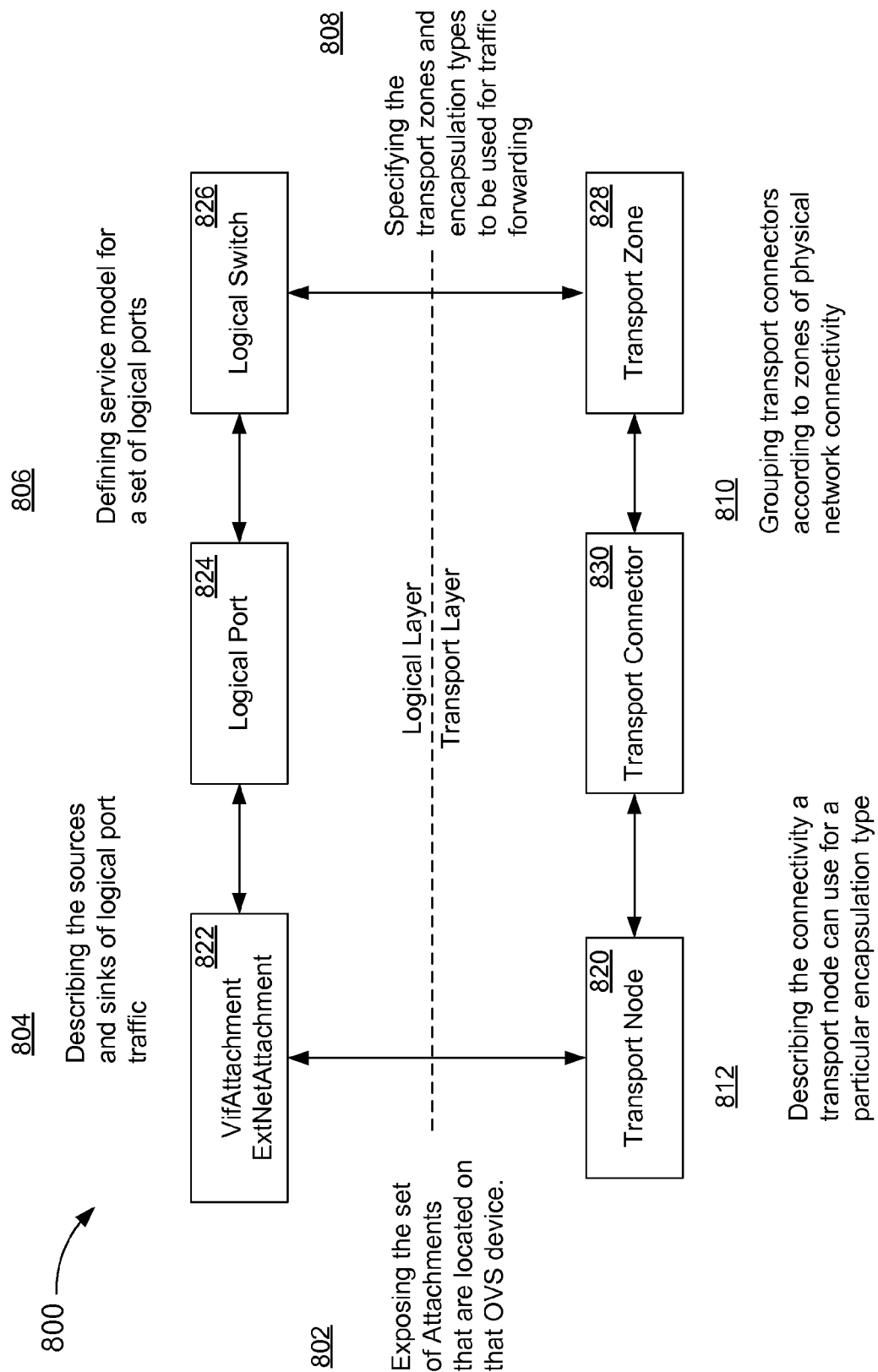
FIG. 8 is a schematic flow diagram of a system, according to an embodiment.

FIG. 8 depicts a flow chart for defining an identity-protection system ("system") according to some embodiments described herein. As shown in FIG. 8, method 800 can be a loop to dynamically update the system. The method 800 includes that one or more exposing a set of attachments 822 that are located on an OVS device, at 802. In some embodiments, operation 802 can be implemented in one or more transport nodes, for example, transport node 820. The method 800 includes describing the sources and sinks of logical port 824 traffic, at 804. In some embodiments, operation 804 can be implemented in association with one or more attachments, for example, VifAttachment/ExtNetAttachment 822. The method 800 includes defining service model for the set of logical ports 824, at 806. In some embodiments, operation 806 can be implemented in one or more logical ports, for example, logical port 824. The method 800 includes specifying one or more transport zones and/or encapsulation types to be used for forwarding traffic, at 808. In some embodiments, operation 808 can be implemented in one or more logical switches; for example, logical switch 826, and a transport zone 828 can be specified. The method 800 includes grouping one or more transport connectors according to zones of physical network connectivity, at 810. In some embodiments, operation 810 can include grouping, for example, transport connector 830. The method 800 includes describing the connectivity that a transport node can use for a particular encapsulation type, at 812. In some embodiments, operation 812 can be implemented in one or more transport connector, for example, transport connector 830, and can include describing the connectivity, for example, of transport node 820.

Figure 9:
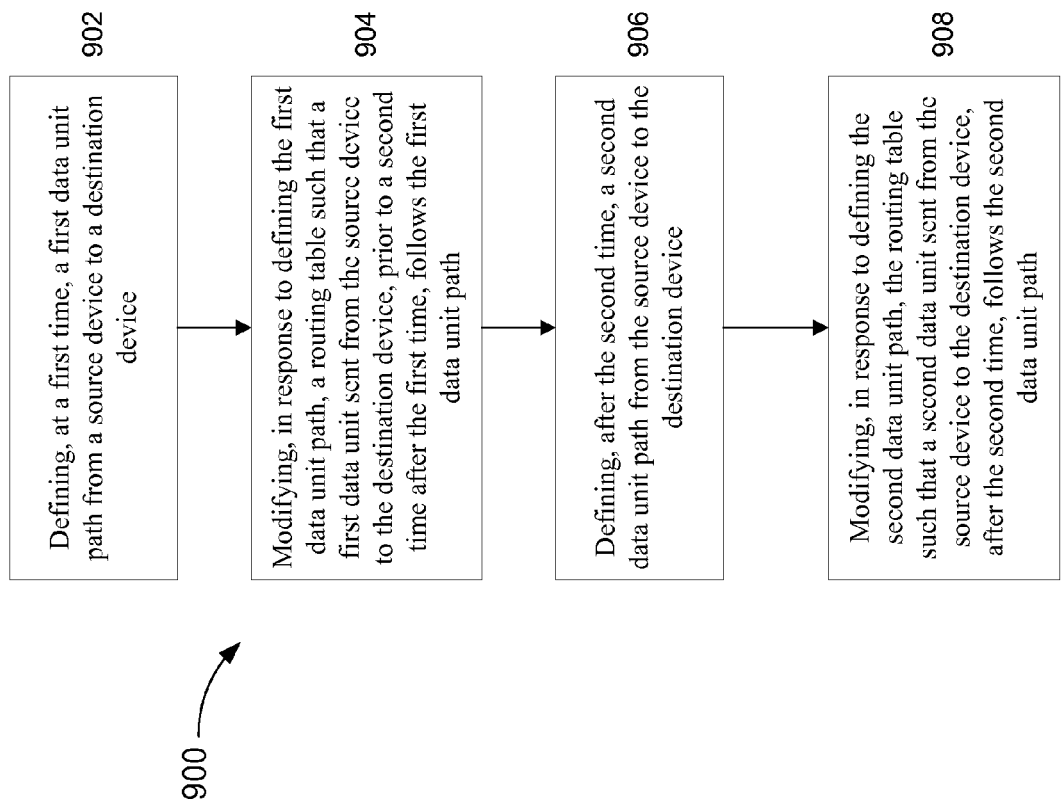
FIG. 9 is a flow chart illustrating a method of operating an identity-protection system, according to an embodiment.

FIG. 9 is a flow chart illustrating a method 900 of operating an identity protection system according to an embodiment. Method 900 includes defining, at a first time, a first data unit path from a source device to a destination device, at 902. The first data unit path includes (1) a first virtual machine and a second virtual machine that are included in a first network, and (2) a third virtual machine that is included in a second network. The first data unit path further includes the first virtual machine, the second virtual machine, and the third virtual machine in a first order. Method 900 includes modifying, in response to defining the first data unit path, a routing table such that a first data unit sent from the source device to the destination device, prior to a second time after the first time, follows the first data unit path, at 904. Method 900 includes defining, after the second time, a second data unit path from the source device to the destination device, at 906. The second data unit path includes each of the first virtual machine, the second virtual machine, and the third virtual machine in a second order different from the first order. The method 900 includes modifying, in response to defining the second data unit path, the routing table such that a second data unit sent from the source device to the destination device, after the second time, follows the second data unit path, at 908.

While shown and/or described herein as including a number of cloud network, other networks, network elements, entities, etc, in some embodiments, there can be more or fewer network, elements and/or entities. For example, while system 600 is shown as including clouds 710, 720 and network elements 711, 721, 731, in other instances system 600 can include more or fewer clouds and/or network elements.

While the networks (e.g., local and legacy network, wide area network, clouds, etc) are shown and described herein in various logical and/or physical configurations, in some embodiments, the networks can include different configuration. For example, while FIG. 4 depicts first cloud 410, second cloud 420 as overlapping, in some embodiments, first cloud 410 and second cloud 420 can be mutually exclusive, logically and/or physically. Similarly, while FIG. 6 depicts first cloud 610, second cloud 620 and network 632 as mutually exclusive, in some embodiments, any of first cloud 610, second cloud 620 and network 632 can be logically and/or physically overlapping and/or mutually exclusive with any other of first cloud 610, second cloud 620 and network 632.

Some embodiments described herein relate to devices (e.g., wireless access points, mobile communication devices) with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

I claim:

1. An apparatus, comprising:
a network layout module implemented in at least one of a processor or a memory, the network module configured to be operatively coupled to a first network that includes a first virtual machine and a second virtual machine, and that is configured to be operatively coupled to a source device and a destination device; and a second network, different from the first network, that includes a third virtual machine, and that is configured to be operatively coupled to the source device and the destination device,
the network layout module configured to: (1) define, at a first time, a first data unit path from the source device to the destination device, the first data unit path including each of the first virtual machine, the second virtual machine, and the third virtual machine in a first order; (2) access a routing table including a representation of the first data unit path; (3) define, at a second time after the first time, and in response to an event or randomly, a second data unit path from the source device to the destination device, the second data unit path including each of the first virtual machine, the second virtual machine, and the third virtual machine in a second order different from the first order; and (4) modify the routing table to include a representation of the second data unit path.

2. The apparatus of claim 1, wherein the first network is a local area network different from the second network that is a cloud network.

3. The apparatus of claim 1, wherein the network layout module is configured to be operatively coupled to a virtual logical switch that is configured to operatively couple each of the first virtual machine, the second virtual machine, and the third virtual machine.

4. The apparatus of claim 1, wherein:
the network layout module is configured to:
define the second data unit path in response to a first event;
send a signal that is configured to cause a fourth virtual machine to be instantiated; and
define, at a third time after the second time, and in response to a second event, a third data unit path from the source device to the destination device, the third data unit path including each of the first virtual machine, the second virtual machine, the third virtual machine, and the fourth virtual machine.

5. The apparatus of claim 1, wherein the network layout module is configured to be operatively coupled to the destination device that includes a storage device.

6. The apparatus of claim 1, wherein the network layout module is configured to define the second data unit path in response to a scheduled event.

7. The apparatus of claim 1, wherein the network layout module is configured to define the second data unit path in response to a malicious activity.

8. A method, comprising:
defining, at a first time, a first data unit path from a source device to a destination device, the first data unit path including (1) a first virtual machine and a second virtual machine that are included in a first network at the first time, and (2) a third virtual machine that is included in a second network at the first time, the first data unit path including the first virtual machine, the second virtual machine, and the third virtual machine in a first order;
modifying, in response to defining the first data unit path, a routing table such that a first data unit sent from the source device to the destination device, prior to a second time after the first time, follows the first data unit path;
sending, after the first time and prior to the second time, a signal such that the second virtual machine is migrated from the first network to the second network;
defining, after the second time, and in response to an event or randomly, a second data unit path from the source device to the destination device, the second data unit path including each of the first virtual machine, the second virtual machine, and the third virtual machine in a second order different from the first order, the first virtual machine included in the first network at the second time, the second virtual machine and the third virtual machine included in the second network at the second time; and
modifying the routing table to include a representation of the second data unit path.

9. The method of claim 8, wherein the first network is a first cloud network and the second network is a second cloud network mutually exclusive from the first cloud network.

10. The method of claim 8, wherein the routing table is associated with a source device network address translation table.

11. The method of claim 8, further comprising:
defining, at a third time after the second time, a third data unit path from the source device to the destination device, the third data unit path including each of the first virtual machine, the second virtual machine, and the third virtual machine in a third order different from the second order; and
modifying, in response to defining the third data unit path, the routing table such that a third data unit sent from the source device to the destination device, after the third time, follows the third data unit path.

12. The method of claim 8, further comprising:
send a signal configured to cause a fourth virtual machine to be instantiated; and
defining, at a third time after the second time, a third data unit path from the source device to the destination device, the third data unit path including each of the first virtual machine, the second virtual machine, the third virtual machine and the fourth virtual machine.

13. The method of claim 8, further comprising:
receiving a signal indicative of a malicious activity; and
defining the second data unit path in response to the signal indicative of the malicious activity.

14. The method of claim 8, wherein the first network and the second network collectively define a virtual private network.

15. The method of claim 8, further comprising modifying, in response to defining the second data unit path, the routing table such that a second data unit sent from the source device to the destination device, after the second time, follows the second data unit path.

16. A non-transitory processor-readable medium storing code representing instructions to cause a processor to perform a process, the code comprising code to:

access a routing table including a representation of a first data unit path;

send, at a first time, a first data unit, received from a source device, to a destination device via the first data unit path, the first data unit path including (1) a first virtual machine and a second virtual machine that are included in a first network, and (2) a third virtual machine that is included in a second network, the first data unit path including the first virtual machine, the second virtual machine, and the third virtual machine in a first order;

access the routing table including a representation of a second data unit path; and send, at a second time after the first time, and in response to an event or randomly, a second data unit, received from the source device, to the destination device via the second data unit path, the second data unit path including each of the first virtual machine, the second virtual machine, the third virtual machine, and a fourth virtual machine in a second order different from the first order, the fourth virtual machine instantiated in the second network after the first time.

17. The non-transitory processor-readable medium storing code representing instructions to cause a processor to perform a process of claim 16, wherein the first network is (1) logically different from the second network, and (2) physically overlapping with the second network.

18. The non-transitory processor-readable medium storing code representing instructions to cause a processor to perform a process of claim 16, the code further comprising code to direct a third data unit, received from the source device, to the destination device via a third data unit path from the source device to the destination device, the third data unit path including each of the first virtual machine, the second virtual machine, and the third virtual machine in a third order, different from the first order and from the second order.

19. The non-transitory processor-readable medium storing code representing instructions to cause a processor to perform a process of claim 16, the code further comprising code to:

define, at a third time after the second time, a third data unit path from the source device to the destination device, the third data unit path including each of the first virtual machine, the second virtual machine, the third virtual machine and the fourth virtual machine in a third order, different from the second order.

20. The non-transitory processor-readable medium storing code representing instructions to cause a processor to perform a process of claim 16, the code further comprising code to receive the first data unit via a Layer-3 protocol.

21. The non-transitory processor-readable medium storing code representing instructions to cause a processor to perform a process of claim 16, the code further comprising code to direct the second data unit to the destination device via the second data unit path in response to a scheduled event.

* * * * *